(12) United States Patent
Bedner et al.

(10) Patent No.: US 11,300,469 B2
(45) Date of Patent: Apr. 12, 2022

(54) PRESSURE SENSOR INCLUDING REPLACEABLE PROCESS SEAL FOR IMPROVED MEASUREMENT ACCURACY

(71) Applicant: Endress+Hauser SE+Co. KG, Maulburg (DE)

(72) Inventors: Kristine Bedner, Schopfheim (DE); Michael Hügel, Lörrach (DE); Thomas Uehlin, Schopfheim (DE); Miriam Volz, Steinen (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 51 days.

(21) Appl. No.: 16/756,766

(22) PCT Filed: Sep. 12, 2018

(86) PCT No.: PCT/EP2018/074632
§ 371 (c)(1),
(2) Date: Apr. 16, 2020

(87) PCT Pub. No.: WO2019/076546
PCT Pub. Date: Apr. 25, 2019

(65) Prior Publication Data
US 2020/0333209 A1    Oct. 22, 2020

(30) Foreign Application Priority Data
Oct. 18, 2017 (DE) .................... 10 2017 124 308.9

(51) Int. Cl.
*G01L 13/02* (2006.01)
*G01L 19/14* (2006.01)
*F16J 15/10* (2006.01)
*G01L 19/00* (2006.01)
*G01L 19/06* (2006.01)

(52) U.S. Cl.
CPC .......... *G01L 19/147* (2013.01); *F16J 15/102* (2013.01); *F16J 15/104* (2013.01); *G01L 19/003* (2013.01); *G01L 19/0627* (2013.01)

(58) Field of Classification Search
None
See application file for complete search history.

(56) References Cited

FOREIGN PATENT DOCUMENTS

| CN | 1662799 A | 8/2005 |
|----|-----------|--------|
| CN | 1829905 A | 9/2006 |
| CN | 106062526 A | 10/2016 |

(Continued)

*Primary Examiner* — Lisa M Caputo
*Assistant Examiner* — Nigel H Plumb
(74) *Attorney, Agent, or Firm* — Christopher R. Powers; Endress+Hauser (USA) Holding Inc.

(57) ABSTRACT

The present disclosure discloses process seals having a form retaining core and a coating of a thermoplastic sealing material for pressure sensors. The process seals can be replaced in simple manner, especially essentially without loss of measurement accuracy. The process seals are characterized by features including that they are pre-aged in a pre-aging method performable in a reproducible manner and insertable in the pressure sensor as replaceable components, wherein the process seals were clamped during the pre-aging method in a clamping apparatus exerting a clamping force thereon, wherein the clamping apparatus has a clamping geometry surrounding the process seal clamped therein, which is essentially identical to the clamping geometry surrounding the process seal in the pressure sensor.

20 Claims, 2 Drawing Sheets

(56) References Cited

FOREIGN PATENT DOCUMENTS

| | | |
|---|---:|---|
| DE | 4213857 A1 | 10/1993 |
| DE | 10227479 A1 | 1/2004 |
| DE | 10334854 A1 | 3/2005 |
| DE | 102010029955 A1 | 12/2011 |
| DE | 102013111910 A1 | 4/2015 |
| DE | 102014102719 A1 | 9/2015 |
| DE | 102014106704 A1 | 11/2015 |
| DE | 102014113083 A1 | 3/2016 |
| DE | 102015104365 A1 | 9/2016 |
| DE | 102016105511 A1 | 9/2017 |
| DE | 102017100402 A1 | 6/2018 |
| EP | 0594808 A1 | 5/1994 |

PRESSURE SENSOR INCLUDING REPLACEABLE PROCESS SEAL FOR IMPROVED MEASUREMENT ACCURACY

CROSS-REFERENCE TO RELATED APPLICATIONS

The present application is related to and claims the priority benefit of German Patent Application No. 10 2017 124 308.9, filed on Oct. 18, 2017 and International Patent Application No. PCT/EP2018/074632, filed on Sep. 12, 2018, the entire contents of which are incorporated herein by reference.

TECHNICAL FIELD

The invention relates to a pressure sensor process seal having a form retaining core and a coating of a thermoplastic sealing material applied on the core, to a pressure sensor equipped with the process seal, as well as to a method for manufacture and for use of such process seals. The process seal can be used in connection with pressure sensors comprising a pressure sensitive means held in a sensor housing,
a process connection connectable with the sensor housing by means of a releasable mechanical connection,
leading through the process connection and an opening provided in the sensor housing to the pressure sensitive means, a pressure transfer duct, via which a front face of the pressure sensitive means is contactable with a medium having a pressure to be measured, and
a clamping apparatus for clamping the pressure sensitive means and the process seal between an outer edge of the front face of the pressure sensitive means and a sealing surface of the process connection, wherein the clamping apparatus comprises an element, which is elastic in a direction extending in parallel with a surface normal to the front face of the pressure sensitive means and which is under a prestress in the case of clamped process seal.

BACKGROUND

Pressure sensors are applied in industrial measurements technology for metrological registering of pressures. In such case, they are connected to a location of use by means of the process connection, where their pressure sensitive means is then supplied via the pressure transfer duct with a medium having the pressure to be measured.

Described in DE 42 13 857 A1 and DE 102 27 479 A1 are pressure sensors, in the case of which an O-ring of an elastomer serving as process seal is clamped between an outer edge of a front face of a pressure sensitive means held in a sensor housing and a sealing surface of a process connection connected with the sensor housing by means of a releasable mechanical connection. In the case of these pressure sensors, both the process connection as well as also the elastomeric O-ring, which during measurement operation are in immediate contact with the medium, can, when required, be replaced.

There are, however, applications, in the case of which elastomeric O-rings cannot be used, or, if used, then only with limitations. An example of this are pressure measurements in the case of chemically aggressive media. The use of process seals of chemically more durable, thermoplastic sealing materials, such as e.g. polytetrafluoroethylene (PTFE), proves, however, to be a problem, since thermoplastic sealing materials do not have sufficient elasticity and creep under pressure.

DE 103 34 854 A1 proposes to solve this problem by providing that a sealing arrangement located in front of the pressure sensitive means is clamped together with the pressure sensitive means in a sensor housing, which has an opening, via which the pressure sensitive means is contactable with the medium bearing the pressure to be measured. This opening is surrounded externally by a circularly shaped, radially inwardly extending shoulder of the sensor housing, on whose inner side the sealing arrangement is clamped between an outer edge of the pressure sensitive means and the shoulder. The sealing arrangement includes a ceramic decoupling ring on its face toward the pressure sensitive means and there is arranged on its face toward the shoulder a gasket of polytetrafluoroethylene (PTFE). Additionally, a clamping apparatus for axial clamping of pressure sensitive means and sealing arrangement is provided, which comprises an element elastic in the axial direction. The elastic element has in the axial direction an elasticity, which is sized in such a manner that the flat seals in the case of pressure fluctuations and pressure surges of the pressure of the medium, as well as in the case of temperature fluctuations, are only exposed to such fluctuations of the axial clamping pressure, which do not degrade their sealing action. At the same time, the elastic element serves for compensating deformations of the flat seals under load related to creep and/or settling of the thermoplastic seal material.

Alternatively, this problem can be handled according to the German patent application DE 10 2017 100 402.5 of Applicant filed on 11 Jan. 2017 for a pressure sensor having the features set forth above in the section describing the field of the invention and whose process seal comprises a form retaining core and a shell of a thermoplastic sealing material at least partially surrounding the core. This process seal is clamped by means of a clamping apparatus for axial clamping of pressure sensitive means and process seal between an outer edge of the front face of the pressure sensitive means and a sealing surface of the process connection, which clamping apparatus comprises an element elastic in the axial direction.

Both solutions enable use of thermoplastic sealing materials chemically significantly more durable compared with elastomers.

Process seals comprising thermoplastic sealing materials can, however, not be directly replaced, when required. A reason for this is the creep and/or settling of the thermoplastic sealing material occurring after the installation of a new process seal in the pressure sensor that leads to a marked reduction of the structural height of the process seal in the axial direction. This reduction of the structural height especially marked especially immediately after the installation can, indeed, be compensated within certain limits by the elastic element. This leads, however, to a reduction of the clamping forces exerted by the elastic element on the process seal and therewith unavoidably also to a reduction of the clamping forces exerted by the elastic element on the pressure sensitive means.

This problem can be handled by readjusting the axial prestress of the elastic element in the factory after the creep of the thermoplastic seal material appropriately before the sensor housing is closed. However, to the extent that at least portions of the inner space of the sensor housing are filled with a potting material, the elastic element is then no longer accessible, so that further readjusting of the prestress is then no longer possible.

Changes of the clamping forces exerted by the clamping apparatus on the pressure sensitive means because of the creep of the thermoplastic seal material and/or the readjusting of the prestress lead to a change of the measurement characteristics of the pressure sensor. For achieving best possible measurement accuracies, these pressure sensors can undergo a calibration in the factory following the clamping of the process seal, as well as following, in given cases, a required readjusting of the axial prestress of the elastic element. In such case, over the total pressure measuring range of the pressure sensor a dependence of a pressure dependent measured variable on the pressure acting on the pressure sensitive means is determined by means of a measuring electronics connected to the pressure sensitive means and stored in the pressure sensor. After that, the pressure sensor can be placed in measurement operation, during which the pressure to be measured is determined based on the measured variable determined in measurement operation and its dependence on the pressure to be measured as determined in the calibration.

Both the readjusting of the prestress of the elastic element as well as also the performance of the calibration method require technical apparatuses designed for such purpose, which are not regularly present at the location of use of the pressure sensor. As a result, a replacement of the process seal at the location of use is not regularly possible.

SUMMARY

It is an object of the invention to provide a process seal for a pressure sensor having the features mentioned above in the section describing the field of the invention, which process seal can be replaced in simple manner, especially essentially without loss of measurement accuracy.

For this, the invention resides in a pressure sensor process seal comprising a form retaining core and a coating of a thermoplastic sealing material applied on the core, wherein the pressure sensor includes
 a pressure sensitive means held in a sensor housing,
 a process connection connectable with the sensor housing by means of a releasable mechanical connection,
 leading through the process connection and an opening provided in the sensor housing to the pressure sensitive means, a pressure transfer duct, via which a face of the pressure sensitive means is contactable with a medium having a pressure to be measured, and
 a clamping apparatus for clamping the pressure sensitive means and the process seal between an outer edge of the front face of the pressure sensitive means and a sealing surface of the process connection, wherein the clamping apparatus comprises an element, which is elastic in a direction extending in parallel with a surface normal to the front face of the pressure sensitive means and which is under a prestress in the case of clamped process seal,
characterized in that the process seal is a process seal pre-aged in a pre-aging method performable in a reproducible manner and insertable in the pressure sensor as a replaceable component, wherein the process seal was clamped during the pre-aging method in a clamping apparatus exerting a clamping force thereon, wherein the clamping apparatus has, surrounding the process seal clamped therein, a clamping geometry, which is identical to the clamping geometry surrounding the process seal in the pressure sensor.

The invention offers the advantage that, when required, process seals of the invention applied in pressure sensors can, at any time, be replaced, without problem, with an equally constructed, identically pre-aged process seal, without meaning that the clamping forces acting on the pressure sensor change in a manner, which would require a readjusting of the prestress of the elastic element and/or a renewed calibration and/or which would lastingly degrade the measurement characteristics, especially the accuracy of measurement, of the pressure sensor.

A preferred embodiment of the process seal is characterized by features including that
 the core is either a one piece core of a form retaining material, especially a ceramic, or comprises an inner, annular body, especially an inner, annular body of ceramic, which is surrounded by an outer annular body having a greater height, especially an outer annular body of titanium, and/or
 the coating (47) is composed of polytetrafluoroethylene (PTFE), of fluorinated ethylene propylene (FEP), of perfluoroalkoxy alkane (PFA) or is composed of a thermoplastic sealing material comprising polytetrafluoroethylene (PTFE), fluorinated ethylene propylene (FEP) or perfluoroalkoxy alkane (PFA).

A first further development of the process seal is characterized by features including that the coating of the process seal has after performance of the pre-aging method a layer thickness, which is greater than or equal to a minimum thickness of 15 µm, especially greater than or equal to a minimum thickness of 20 µm, wherein the layer thickness is especially less than or equal to a maximum thickness of 70 µm, especially less than or equal to a maximum thickness of 50 µm, especially less than or equal to a maximum thickness of 30 µm.

A second further development of the process seal is characterized by features including that the process seal is embodied as a process seal subjected after termination of the pre-aging method to a post-treatment, in the case of which excess sealing material, which crept during the pre-aging method, is removed by the post-treatment, wherein the excess sealing material is removed especially by smooth cutting.

Another embodiment of the process seal is characterized by features including that the coating extends at least over mutually opposite surfaces of the core facing in the pressure sensor the edge of the front face of the pressure sensitive means and the sealing surface of the process connection, wherein the coating especially extends also over at least one other surface, especially an outer lateral surface of the core and/or is embodied as a jacketing surrounding the core on all sides.

Furthermore, the invention resides in a pressure sensor comprising a process seal of the invention and characterized in that the pressure sensor further comprises
 the pressure sensitive means held in the sensor housing,
 the process connection connectable with the sensor housing by means of the releasable mechanical connection,
 the pressure transfer duct leading through the process connection and the opening provided in the sensor housing to the pressure sensitive means, via which the front face of the pressure sensitive means is contactable with the medium under a pressure to be measured, and
 the clamping apparatus for clamping the pressure sensitive means and the process seal and having the element, which is elastic in a direction extending in parallel with a surface normal to the front face of the pressure sensitive means and which is under a prestress, wherein the process seal is clamped between the outer edge of the front face of the pressure sensitive means and the sealing surface of the process connection.

Further developments of the pressure sensor are characterized by features including that the elastic element of the clamping apparatus acts on a process connection far, rear face of the pressure sensitive means between the pressure sensitive means and a counterbearing, especially a pressing ring, the elastic element comprises a spring system and/or one or more mutually contacting springs, especially one or more Belleville springs, a decoupling ring is arranged between the pressure sensitive means and the elastic element, the process connection has, introduced into the opening with loose fit and protruding into the opening, an end section, whose end facing the pressure sensitive means comprises the sealing surface, the sealing surface of the process connection is embodied as a seal seat, which has a surface contour corresponding to a surface contour of the surface of the process seal facing the process connection, and/or the process connection comprises a ledge, whose shoulder facing the sensor housing rests against an abutment surface of the sensor housing serving as an abutment for the releasable connection and facing the process connection.

A preferred embodiment of the pressure sensor is characterized by features including that the pressure sensitive means is inserted into a cavity in the sensor housing with interpositioning of a ring of angular cross section having a cross sectionally essentially L-shaped profile, and the ring of angular cross section comprises an essentially cylindrical region arranged in an annular gap between the pressure sensitive means and an inner wall of the cavity outwardly surrounding such and a radially inwardly extending shoulder gripping around an outer edge region of the front face of the pressure sensitive means, and the ring of angular cross section lies against a ledge of the sensor housing externally bounding the opening of the sensor housing on all sides, wherein the ring of angular cross section is especially composed either completely of an elastomer or comprises a first component of a form-retaining material, wherein the first component comprises a pressure sensitive means far, lower part of the radially inwardly extending shoulder, extends in the axial direction into the cylindrically shaped gap and is connected with a second component of an elastic material, which extends into the cylindrically shaped gap at least sectionally between an outer lateral surface of the pressure sensitive means and the inner wall of the cavity.

A further development of the last embodiment of the pressure sensor is characterized by features including that the ring of angular cross section, especially its shoulder, forms an external containment of the process seal.

Furthermore, the invention includes a method for producing process seals of the invention and for their use in a pressure sensor of the invention, characterized in that process seals insertable in the pressure sensor are prefabricated by coating their core with the coating and the new seal obtained in this way is pre-aged by means of the pre-aging method performable in a reproducible manner by clamping the new seal in the clamping apparatus for exerting the clamping force thereon, wherein the clamping apparatus has surrounding the process seal clamped therein a clamping geometry, which is essentially identical to the clamping geometry surrounding the process seal in the pressure sensor, and one of the process seals is clamped in the pressure sensor by connecting by means of the releasable mechanical connection a process connection with interpositioning of the process seal with the sensor housing of a prefabricated assembly comprising the sensor housing, the pressure sensitive means held therein and the clamping apparatus, and the process seal clamped in the pressure sensor is subsequently replaced at least once with an equally constructed, identically pre-aged, process seal and/or the process connection is replaced at least once with a process connection of other process connection type and/or other process connection geometry.

A first further development of the method is characterized by features including that the coatings of the new seals have an initial layer thickness in the order of magnitude of 50 μm to 200 μm, and/or the coatings of the pre-aged process seals have a layer thickness,
  which is greater than or equal to a minimum layer thickness of 15 μm, especially 20 μm, and/or
  which is less than or equal to a maximum thickness of 70 μm, especially 50 μm, especially 30 μm.

Other further developments of the method are characterized by features including that the clamping force exerted during the pre-aging method by means of the clamping apparatus on the seal is truly greater than a clamping force exerted by the prestressed element on the process seal clamped in the pressure sensor, a clamping force predetermined as a function of the nominal pressure range of the pressure sensor, wherein, in the case of a predetermined clamping force in the range from 5000 N to 7000 N during the pre-aging method, a clamping force in the order of magnitude of 5500 N to 7500 kN is set, the seal is heated during the pre-aging method to a temperature, which is greater than or equal to a temperature upper limit of a use temperature range of the pressure sensor, especially a use temperature range of −10° C. to +125° C. or from −40° C. to +150° C., wherein the temperature exceeds the temperature upper limit especially by less than 100° C., especially by less than 50° C., and/or the time period, during which the seal is pre-aged, is sized in such a manner that the seal reaches during the period of time an essentially stable, tentative end state as regards creep properties of the seal material.

Another further development of the method is characterized by features including that the process seals are subjected after termination of the pre-aging method to a post-treatment, in the case of which crept, excess sealing material is removed, especially by smooth cutting, before the process seal is inserted into the pressure sensor.

Another further development of the method is characterized by features including that before initial start-up of the pressure sensor with one of the prefabricated process seals in the case of process seal clamped in the pressure sensor the prestress of the elastic element of the clamping apparatus is set before an initial start-up of the pressure sensor in such a manner that the clamping force exerted by the element on the pressure sensitive means and the pre-aged process seal lies in a value range predetermined for a nominal pressure range of the pressure sensor, and/or a calibration method is performed, in the case of which a dependence of the pressure dependent measured variable derived by means of the pressure sensitive means and a measuring electronics connected thereto on the pressure to be measured acting on the pressure sensitive means over the total pressure measuring range of the pressure sensor is determined and stored in the pressure sensor, based on which dependence the pressure sensor determines the pressure to be measured during subsequent measurement operation.

Another further development of the method is characterized by features including that the pressure sensor, after each replacement of the process seal and/or of the process connection, resumes measurement operation with an essentially unchanged accuracy of measurement, without requiring that first a renewed adjusting of the prestress of the elastic element and/or a renewed calibration be performed.

BRIEF DESCRIPTION OF THE DRAWINGS

The invention and its advantages will now be explained in greater detail based on the figures of the drawing, in which an example of an embodiment is shown. Equal elements are provided in the figures with equal reference characters. The figures of the drawing show as follows.

DETAILED DESCRIPTION

Figure 1:
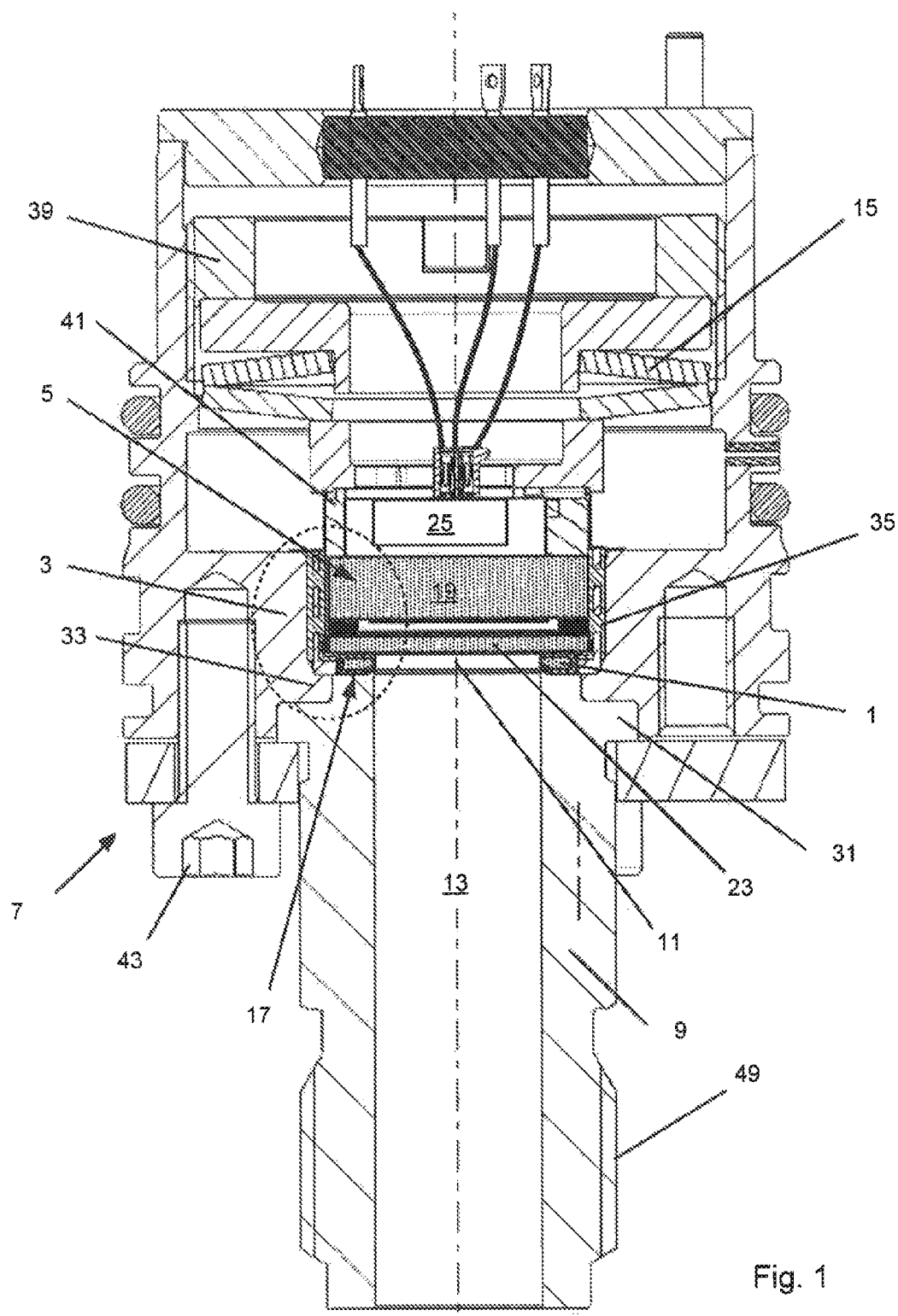
FIG. 1 shows a pressure sensor of the present disclosure.

The invention includes a process seal 1 for a pressure sensor, a pressure sensor equipped with such a process seal 1, as well as a method for manufacture and for use of process seals 1 of the invention.

Process seals 1 of the invention can be used in pressure sensors, which comprise:

a pressure sensitive means 5 held in a sensor housing 3, a process connection 9 connectable with the sensor housing 3 by means of a releasable mechanical connection 7, leading through the process connection 9 and an opening 11 provided in the sensor housing 3 to the pressure sensitive means 5, a pressure transfer duct 13, via which a front face of the pressure sensitive means 5 is contactable with a medium having a pressure to be measured, and a clamping apparatus for clamping the pressure sensitive means 5 and the process seal 1 between an outer edge of the front face of the pressure sensitive means 5 and a sealing surface 17 of the process connection 9, wherein the clamping apparatus comprises an element 15, which is elastic in a direction extending axially, i.e. in parallel with a surface normal to the front face of the pressure sensitive means 5, and which is under a prestress in the case of clamped process seal 1.

Figure 2:
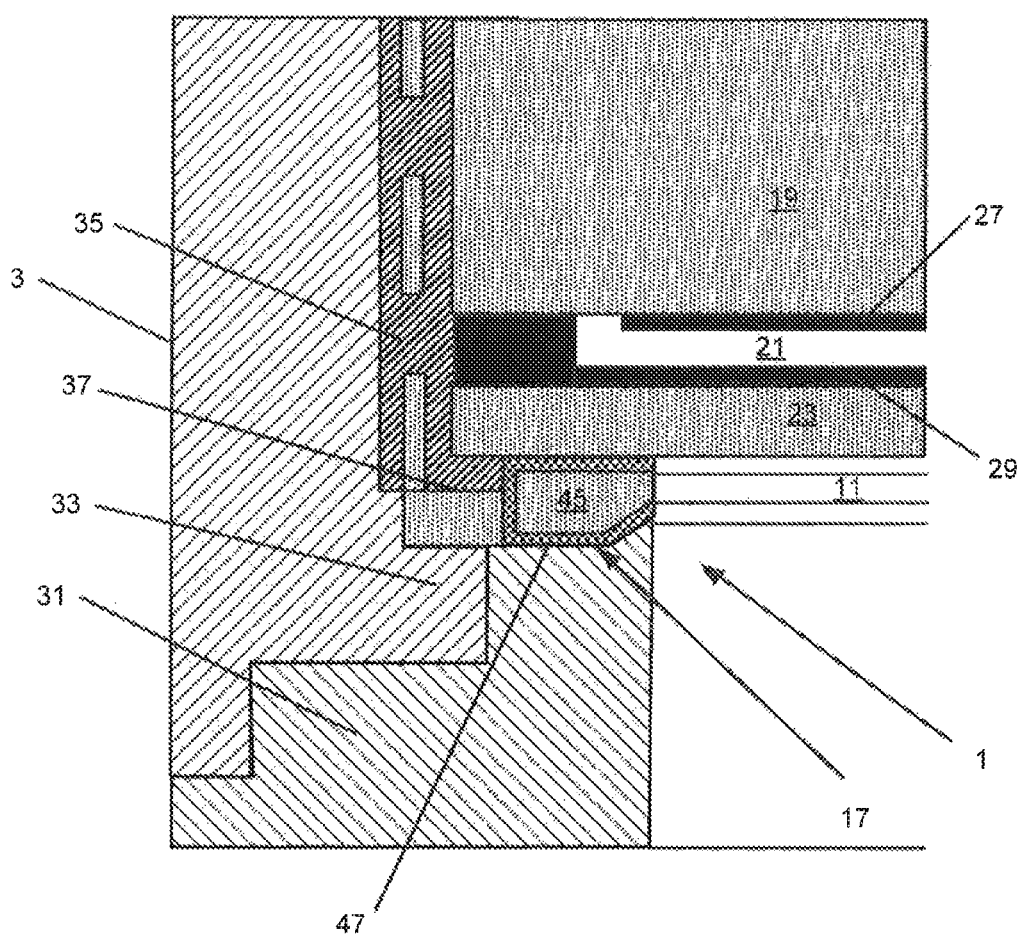
FIG. 2 shows a detail view of the pressure sensor of FIG. 1.

FIG. 1 shows a sectional drawing of an example of an embodiment of such a pressure sensor. FIG. 2 shows an enlarged representation of the detail of the pressure sensor of FIG. 1 circled in FIG. 1.

In these pressure sensors, pressure sensitive means known from the state of the art can be used, whose front face is contactable with medium under pressure. FIG. 1 shows in this connection as an example of an embodiment a pressure sensitive means 5 having a platform 19 and a measuring membrane 23 of a material, such as e.g. ceramic, resistant to the medium, connected with the platform 19 to enclose a pressure chamber 21, and deformable by an externally acting pressure. The pressure sensitive means 5 comprises an electromechanical transducer, which converts the deflection of the measurement membrane 23 dependent on the pressure acting on the measurement membrane 23 into an electrical variable dependent on the pressure to be measured. The electrical variable is registered by means of a measuring electronics 25 connected to the pressure sensitive means 5, especially its transducer, and converted into a measured variable dependent on the pressure to be measured. As an example of an embodiment for this, FIG. 1 shows a capacitive transducer, which includes, arranged on a face of the platform 19 toward the membrane, an electrode 27, which forms together with a counter electrode 29 arranged on a platform-facing inner face of the measurement membrane 15 a capacitor having a capacitance dependent on the deformation of the measurement membrane 21. Alternatively, naturally also an electromechanical transducer relying on another transducer principle can be applied, such as e.g. an optical, interferometric or piezoresistive transducer.

The process connection 9 shown here as an example has, externally surrounding the pressure transfer duct 13, an essentially cylindrical section, which is externally surrounded by a radially externally extending protrusion 31, whose surface facing the sensor housing 3 rests against an abutment surface of the sensor housing 3 serving as an abutment for the releasable connection 7 and facing the process connection 9. This provides always a highly precise, reproducible positionability of the process connection 9 relative to the sensor housing 3.

The cylindrical section can optionally have, introduced with loose fit into the opening 11, an end section, whose end facing the pressure sensitive means 5 comprises the sealing surface 17 of the process connection 9. The sealing surface 17 is preferably embodied as a seal seat, which has a surface contour corresponding to a surface contour of the surface of the process seal 1 facing the process connection 9.

The elastic element 15 of the clamping apparatus is preferably arranged and embodied in such a manner that it exerts a clamping force directed in the direction of the front face of the pressure sensitive means 5 on a rear face of the pressure sensitive means 5 opposite the front face of the pressure sensitive means 5.

The prestress of the elastic element 15 is preferably sized, or set, in such a manner that the clamping force exerted by the element 15 on the pressure sensitive means 5 and the process seal 1 lies in a value range predetermined for a pressure measuring range of the pressure sensor, frequently also referred to as its nominal pressure range. This value range is sized in such a manner that the clamping force is large enough over the total pressure measuring range, in order to assure a sufficient sealing action of the clamped process seal 1. Thus, for a pressure sensor having a nominal pressure range of 100 bar, a clamping force can be set, for example, in the range from 5000 N to 7000 N.

In such case, the mounting of the pressure sensitive means 5 in the sensor housing 3 also assures that the pressure sensitive means 5 is not expelled from the sensor housing 3 through the opening 11 when the process connection 9 is removed. For this, it is sufficient that the opening 11 surrounded outwardly on all sides by a ledge 33 of the sensor housing 3 has an area, which is less than an area of the front face of the pressure sensitive means 5.

Optionally, the pressure sensitive means 5 can be placed in a cavity in the sensor housing 3 with interpositioning of a ring 35 of angular cross section optionally shown in FIG. 1 with a cross sectionally essentially L-shaped profile. The ring 35 of angular cross section includes an essentially cylindrical region, which is arranged in an annular gap between the pressure sensitive means 5 and the inner wall of the cavity outwardly surrounding the pressure sensitive means 5, as well as a radially inwardly extending shoulder 37, which grips around an outer edge region of the front face of the pressure sensitive means 5. The ring 35 of angular cross section serves for positioning the pressure sensitive means 5 in a position exactly defined in the radial direction in the sensor housing 3 and protects the pressure sensitive means 5 against forces acting thereon in the radial direction, such as e.g. thermomechanical forces. For this, even a one piece ring of an elastomer is sufficient. Preferably, the ring 35 of angular cross section is embodied, however, in the manner described in DE 10 2010 029 955 A1. This form of embodiment is shown in FIG. 1. In such case, the ring 35 of angular cross section comprises a first component of a form-retaining material, which includes a pressure sensitive means far, lower part of the radially inwardly extending shoulder 37 and extends in the axial direction into the cylindrically shaped gap. Additionally, it comprises a second component of an elastic material connected with the first component and extending in the cylindrically shaped gap at least sectionally between the outer lateral surface of the pressure sensitive means 5 and the inner wall of the cavity.

The ring 35 of angular cross section lies on the ledge 33 of the sensor housing 3 bounding the opening 11 externally on all sides. Additionally, it is preferably embodied and arranged in such a manner that its shoulder 37 grips around the process seal 1 externally on all sides, wherein the shoulder 37 is formed preferably in such a manner that it forms an external containment of the process seal 1.

In the case of the clamping apparatus shown as an example of an embodiment in FIG. 1, the elastic element 15 is clamped between the pressure sensitive means 5 and a counterbearing 39 arranged toward a process connection far end of the sensor housing 3. Suited as counterbearing 39 in such case is e.g. a pressing ring installed, e.g. screwed in, in the sensor housing 3. The prestress of the elastic element 15 is adjustable via the position of the pressing ring. The elastic element 15 can, for example, comprise a spring system and/or one or more mutually contacting springs elastic in the axial direction, such as e.g. the Belleville spring shown in FIG. 1. The axially elastic element 15 can be arranged directly on the process connection 9 far, rear face of the pressure sensitive means 5. Preferably, a decoupling ring 41 optionally shown in FIG. 1 is arranged between the pressure sensitive means 5 and the elastic element 15. The decoupling ring 41 is preferably composed of a material, e.g. a ceramic material, matched to the coefficient of thermal expansion of the pressure sensitive means 5, and protects the pressure sensitive means 5 against forces acting thereon in the radial direction, e.g. caused by the elastic element 15 and/or by thermomechanical stresses.

FIG. 1 shows, as an example of a releasable mechanical connection 7 between sensor housing 3 and process connection 9, a screwed connection, which comprises a number of screws 43, each of which can pass, or passes, through a passageway provided in the process connection 9 and is capable of being screwed into, or is screwed into, an associated blind bore provided in the sensor housing 3. Alternatively, the releasable mechanical connection 7 can naturally also be implemented in other ways known to those skilled in the art. Examples include, placed on the sensor housing 3 or on the process connection 9, coupling nuts, which screw onto corresponding external threads of the other connection partner, or connections based on clamping mechanisms (clamp-on).

The process seal 1 comprises a form retaining core 45 and a coating 47 of a thermoplastic sealing material applied on the core 45.

Examples of suitable thermoplastic sealing materials include polytetrafluoroethylene (PTFE), fluorinated ethylene propylene (FEP), perfluoroalkoxy alkane (PFA), or a sealing material comprising PTFE, FEP or PFA.

Coating 47 extends at least over mutually opposite surfaces of the core 45 facing in the pressure sensor the edge of the front face of the pressure sensitive means 5 and the sealing surface 17 of the process connection 9. Additionally, coating 47 can also extend over other surfaces of the core 45 and/or be embodied as a jacket surrounding the core 45 on all sides. FIGS. 1 and 2 show, for this, an example of an embodiment, in the case of which the coating 47 is embodied as a shell extending over mutually opposite surfaces and an outer lateral surface of the core 45.

Core 45 can be embodied as a one piece core. In the case shown in FIGS. 1 and 2, it is composed preferably of a material, such as e.g. a ceramic, that has a coefficient of thermal expansion matched to the coefficient of thermal expansion of the pressure sensitive means 5.

Alternatively, however, also a two- or multi-part core can be used, such as e.g. the two part core described in German patent application No. DE 10 2017 100 402.5 filed 11 Jan. 2017. This comprises an inner, annular body, e.g. an annular body of ceramic, which is surrounded by an outer annular body having a greater height, e.g. an annular body of titanium. For functioning and forms of embodiment of cores of such type, reference is made to the aforementioned German patent application.

Independently of the particular embodiment, core 45 effects a form-stable support of the thermoplastic coating 47 both upon the clamping of the process seal 1 as well as also in the clamped state. This offers the advantage that the process seals 1 can have comparatively large external dimensions, without requiring for this that a correspondingly large amount of thermoplastic sealing material must be used.

Process seals 1 of the invention are characterized by features including that they are embodied as process seals 1 pre-aged in a pre-aging method performable in a reproducible manner and insertable in the pressure sensor as a replaceable component, wherein the process seals 1 were clamped during the pre-aging method in a clamping apparatus exerting a clamping force thereon. In such case, with an eye toward the later application of the replaceable process seal 1, a clamping apparatus is applied, which has surrounding the seal clamped therein, a clamping geometry, which is essentially identical to the clamping geometry surrounding the process seal 1 in the pressure sensor.

These process seals 1 are produced by coating their core 45 with the coating 47 and the new seal obtained in this way is pre-aged by means of the pre-aging method. In such case, the coating 47 of the new seal can have, for example, an initial layer thickness in the order of magnitude of 50 µm to 200 µm.

Then, the new seal is subjected to the pre-aging method performable in a reproducible manner. For this, especially suitable is a method, in which the seal is clamped in the clamping apparatus at a predetermined temperature for a predetermined time period.

In such case, the clamping force exerted by means of the clamping apparatus on the seal is preferably sized in such a manner that it is truly greater than the clamping force exerted by the prestressed element 15 on the process seal 1 clamped in the pressure sensor. Thus, for example, for producing a pre-aged process seal 1 for a pressure sensor having a nominal pressure range of 100 bar, in which the pre-aged process seal 1 is clamped with a clamping force in the range from 5000 N to 7000 N in the pressure sensor, a clamping force in the order of magnitude of 5500 N to 7500 kN can be used during the pre-aging method.

Since thermoplastic sealing materials creep not only because of pressure but, also, as a result of temperature and pressure sensors are regularly applied over a large temperature range, e.g. a temperature range of −10° C. to +125° C. or even from −40° C. to +150° C., the predetermined temperature, to which the seal is heated during the pre-aging method, is preferably sized in such a manner that it is greater than or equal to a temperature upper limit of a use temperature range, wherein the pre-aging temperature exceeds the temperature upper limit preferably by less than 100° C., especially preferably by less than 50° C.

The time period, over which the seal is pre-aged, is preferably sized in such a manner that the seal during the time period reaches during the period of time an essentially stable, tentative end state as regards creep properties of the seal material.

In such case, changes of the height of the seal extending in parallel with the clamping direction of the seal caused during the pre-aging method by settling and/or creep of the seal material under pressure and temperature are preferably cancelled by the clamping apparatus. For this, the clamping apparatus can comprise e.g. an elastic element under prestress, such as e.g. a spring, whose prestress, when required, is re-adjustable.

Optionally, the process seals 1 can be subjected to a post-treatment after termination of the pre-aging method. In the post-treatment, crept, excess, sealing material is removed. This post-treatment is especially advantageous in the case of process seals 1, which are applied in pressure sensors, which are operated at locations of use having high requirements for hygiene and cleanability. In such case, e.g. a smooth cutting away of excess material during the post-treatment can achieve that the pressure transfer duct 13 in the region of the process seal 1 has an easily cleaned, essentially hollow space- and undercut free, inner diameter.

In the present state of the art, the view is held that seals comprising thermoplastic sealing materials can be used only once due to the creep behavior of these sealing materials partly responsible for their sealing action. Counter to this reigning opinion, investigations of the applicant have shown that the thermoplastic sealing material of the pre-aged process seal 1, in spite of its essentially stable, tentative end state achieved by the pre-aging, does still creep in sufficient measure in a subsequent clamping of the pre-aged process seal 1 in a pressure sensor, in order, in given cases, to compensate for present irregularities of the sealing surfaces of pressure sensitive means 5 and process connection 25 and so to provide a high-quality, pressure tight sealing. Thus, process seals 1 of the invention can provide a helium-leak rate in the order of magnitude of $10^{-7}$ mbar l/s.

Thus, it has proven to be especially advantageous that the coating 47 on the core 45 is applied with an initial layer thickness, which is sized in such a manner that the layer thickness of the pre-aged process seal 1 produced therefrom by the pre-aging method is greater than or equal to a minimum thickness of 15 µm, especially preferably, even greater than or equal to a minimum thickness of 20 µm.

At the same time, the deformation of such process seals 1 arising as a result of the subsequent creep of the thermoplastic sealing material process seals 1 of the invention after their clamping in the pressure sensor is, however, so small that the clamping forces acting on the pressure sensitive means 5 resulting from a replacement of a pre-aged process seal 1 of the invention with another equally constructed process seal 1 of the invention pre-aged in the same manner do not change or change only to a very small degree.

Thus, it has proven to be especially advantageous that the coating 47 on the core 45 be applied with an initial layer thickness, which is sized in such a manner that the layer thickness of the pre-aged process seal 1 produced therefrom by the pre-aging method is less than or equal to a maximum thickness of 70 µm, preferably less than or equal to a maximum thickness of 50 µm and, especially preferably, even less than or equal to a maximum thickness of 30 µm.

Furthermore, the invention includes a method for producing process seals 1 of the invention and for their use in a pressure sensor of the invention. In such case, process seals 1 of the invention insertable in the pressure sensor are prefabricated in the above described manner.

Then, one of these process seals 1 is clamped in the pressure sensor by connecting by means of the releasable mechanical connection 7 a process connection 9 with interpositioning of the process seal 1 with the sensor housing 3 of a prefabricated assembly comprising the sensor housing 3, the pressure sensitive means 5 held therein and the clamping apparatus including the elastic element 15.

Additionally, preferably, the prestress of the elastic element 15 of the clamping apparatus is set in such a manner, before initial start-up of the pressure sensor with a process seal 1 of the invention in the case of process seal 1 clamped in the pressure sensor, that the clamping force exerted by the elastic element 15 on the pressure sensitive means 5 and the process seal 1 clamped in the pressure sensor lies in the value range predetermined for the nominal pressure range of the pressure sensor.

Alternatively or supplementally, preferably there is executed before initial start-up of the pressure sensor with a process seal 1 of the invention in the case of process seal 1 clamped in the pressure sensor a calibration method, in the case of which a dependence of the pressure dependent measured variable derived by means of the pressure sensitive means 5 and the measuring electronics 25 connected thereto on the pressure to be measured acting on the pressure sensitive means 5 is determined for the total pressure measuring range of the pressure sensor and stored in the pressure sensor. Then, the pressure sensor can perform an initial measurement operation, during which it determines the pressure to be measured based on the measured variable determined in measurement operation and its dependence on the pressure acting on the pressure sensitive means 5.

Subsequently, the process seal 1 clamped in the pressure sensor is replaced at least once with an equally constructed, identically pre-aged, process seal 1 of the invention and/or the process connection 9 is replaced at least once with a process connection 9 of other process connection type and/or other process connection geometry.

After each replacement of the process seal 1 and/or of the process connection 9, the pressure sensor resumes measurement operation with essentially unchanged accuracy of measurement, without requiring that first a readjusting of the prestress of the elastic element 15 and/or a renewed calibration must be performed.

The replaceability of the process seal 1 is especially advantageous in applications, in which high requirements for hygiene and cleanability of the pressure sensors are present. In such case, it offers the additional advantage that the process seal 1 can be deinstalled, in order to be able to perform a proof required in some fields that a previously performed cleaning was successfully performed.

Moreover, the modular construction of pressure sensors of the invention offers the advantage as regards the multiplicity of different process connection types and—geometries applied in industrial measurements technology that prefabricated assemblies comprising the sensor housing 3, the pressure sensitive means 5 and the clamping apparatus can be equipped as needed with process connections 9 of the most varied process connection types and/or different process connection geometries. The process connection 9 shown in FIG. 1 includes as a possible example an external thread 49, which can be screwed into a complementary internal thread provided at the location of use. Alternatively, naturally also process connections 9 can be applied, which are equipped with a connection of another connection type or—geometry, such as e.g. a flange or a dairy tube connection.

The invention claimed is:

1. A process seal for a pressure sensor, the process seal comprising:
a form-retaining core; and
a coating of a thermoplastic sealing material applied on the core,
wherein the process seal is configured as a replaceable component of a pressure sensor and is pre-aged in a reproducible manner by clamping the process seal in a seal clamping apparatus that exerts a clamping force thereon, wherein the seal clamping apparatus has, surrounding the process seal clamped therein, a clamping geometry, which is essentially identical to a clamping geometry surrounding the process seal when inserted into the pressure sensor,
wherein the pressure sensor comprises:
a pressure sensitive element disposed in a sensor housing;
a process connection adapted to connect with the sensor housing via a reversible mechanical connection;
a pressure transfer duct leading through the process connection and an opening in the sensor housing to the pressure sensitive element such that a front face of the pressure sensitive element is contactable with a medium having a pressure to be measured via the pressure transfer duct; and
a sensor clamping apparatus configured to clamp the pressure sensitive element and the process seal between an outer edge of the front face of the pressure sensitive element and a sealing surface of the process connection, wherein the sensor clamping apparatus of the process sensor includes an elastic element which is elastic in a direction extending in parallel with a surface normal of the front face of the pressure sensitive element and which is under a prestress when a process seal is clamped therein.

2. The process seal of claim 1, wherein:
the core is a one-piece core comprising a form-retaining ceramic material; and
the coating is composed of polytetrafluoroethylene (PTFE), of fluorinated ethylene propylene (FEP), of perfluoroalkoxy alkane (PFA) or of a thermoplastic sealing material comprising polytetrafluoroethylene (PTFE), fluorinated ethylene propylene (FEP) or perfluoroalkoxy alkane (PFA).

3. The process seal of claim 1, wherein:
the core includes an inner annular ceramic body surrounded by an outer annular body having a height greater than the inner annular ceramic body; and
the coating is composed of polytetrafluoroethylene (PTFE), of fluorinated ethylene propylene (FEP), of perfluoroalkoxy alkane (PFA) or of a thermoplastic sealing material comprising polytetrafluoroethylene (PTFE), fluorinated ethylene propylene (FEP) or perfluoroalkoxy alkane (PFA).

4. The process seal of claim 3, wherein the outer annular body is composed of titanium.

5. The process seal of claim 1, wherein, after the pre-aging, the coating of the process seal has a layer thickness that is greater than or equal to a minimum thickness of 15 μm, especially greater than or equal to a minimum thickness of 20 μm, wherein the layer thickness is less than or equal to a maximum thickness of 70 μm, especially less than or equal to a maximum thickness of 50 μm, especially less than or equal to a maximum thickness of 30 μm.

6. The process seal of claim 5, wherein the layer thickness is greater than or equal to a minimum thickness of 20 μm and less than or equal to a maximum thickness of 30 μm.

7. The process seal of claim 1, wherein the process seal, after the pre-aging, is given a post-treatment in which excess sealing material, which crept during the pre-aging, is removed by the post-treatment, wherein the excess sealing material is removed especially by smooth cutting.

8. The process seal of claim 1, wherein the coating extends at least over mutually opposite surfaces of the core, which face the edge of the front face of the pressure sensitive element and the sealing surface of the process connection, wherein the coating further extends over at least one other surface, or extends to surround the core on all sides.

9. A method for manufacturing the process seal of claim 1, the method comprising:
coating the core with the coating;
pre-aging the process seal in a reproducible manner by clamping the process seal in the seal clamping apparatus that exerts the clamping force thereon, wherein the seal clamping apparatus has, surrounding the process seal clamped therein, the clamping geometry, which is essentially identical to the clamping geometry surrounding the process seal when inserted into the pressure sensor;
clamping the process seal in the pressure sensor by connecting, via the releasable mechanical connection, the process connection with interpositioning of the process seal with the sensor housing of a prefabricated assembly comprising the sensor housing, the pressure sensitive element assembled therein and the sensor clamping apparatus; and
subsequently replacing the process seal clamped in the pressure sensor at least once with an equally constructed, identically pre-aged process seal, and/or replacing the process connection at least once with a process connection of other process connection type and/or other process connection geometry.

10. The method of claim 9, wherein the coating is applied with an initial layer thickness of about 50 μm to 200 μm, and/or the coating after the pre-aging has a layer thickness, which is:

greater than or equal to a minimum layer thickness of 15 μm, and/or
less than or equal to a maximum thickness of 70 μm.

11. The method of claim 9, wherein:
the clamping force exerted on the process seal via the seal clamping apparatus during the pre-aging is greater than a clamping force exerted by the elastic element on the process seal when clamped in the pressure sensor, wherein the clamping force is predetermined as a function of a nominal pressure range of the pressure sensor, wherein, in the case of a predetermined clamping force in the range from 5000 N to 7000 N during the pre-aging, a clamping force of 5500 N to 7500 kN is applied;
the process seal is heated during the pre-aging to a temperature that is greater than or equal to an upper limit of a use temperature range of the pressure sensor, wherein the temperature exceeds the upper limit by less than 100° C.; and/or
a time period, during which the process seal is pre-aged, is such that the process seal reaches an essentially stable, tentative end state as regards creep properties of a material of the process seal during the time period.

12. The method of claim 11, wherein the use temperature range of the pressure sensor is −10° C. to +125° C. or −40° C. to +150° C.

13. The method of claim 9, further comprising post-treating the process seal after the pre-aging, the post-treating comprising removing crept, excess sealing material is removed before the process seal is inserted into the pressure sensor.

14. The method of claim 13, wherein the excess sealing material is removed by smooth cutting.

15. The method of claim 9, further comprising, before an initial start-up of the pressure sensor with the pre-aged process seal:
setting the prestress of the elastic element of the sensor clamping apparatus such that the clamping force exerted by the elastic element on the pressure sensitive element and the pre-aged process seal is in a value range predetermined for a nominal pressure range of the pressure sensor; and/or
performing a calibration operation, in the case of which a dependence of a pressure-dependent measured variable derived via the pressure sensitive element and a measuring electronics connected thereto on a pressure to be measured acting on the pressure sensitive element over a total pressure measuring range of the pressure sensor is determined and stored in the pressure sensor, based on which dependence the pressure sensor determines the pressure to be measured during subsequent measurement operation.

16. The method of claim 15, wherein the pressure sensor, after each replacement of the process seal and/or of the process connection, resumes a measurement operation with an essentially unchanged accuracy of measurement, without requiring that a renewed adjusting of the prestress of the elastic element and/or a renewed calibration be performed.

17. A pressure sensor, comprising:
a process seal comprising:
 a form-retaining core; and
 a coating of a thermoplastic sealing material applied on the core,
 wherein the process seal is configured as a replaceable component of a pressure sensor and is pre-aged in a reproducible manner by clamping the process seal in a seal clamping apparatus that exerts a clamping force thereon, wherein the seal clamping apparatus has, surrounding the process seal clamped therein, a clamping geometry, which is essentially identical to a clamping geometry surrounding the process seal when inserted into the pressure sensor;
a pressure sensitive element disposed in a sensor housing;
a process connection configured as a releasable mechanical connection with the sensor housing;
a pressure transfer duct leading through the process connection and an opening in the sensor housing to the pressure sensitive element via which a front face of the pressure sensitive element is contactable with a medium under a pressure to be measured; and
a sensor clamping apparatus configured for clamping the pressure sensitive element and the process seal, the sensor clamping apparatus including an elastic element, which is elastic in a direction extending in parallel with a surface normal to the front face of the pressure sensitive element and which is under a prestress,
wherein the process seal is clamped between an outer edge of the front face of the pressure sensitive element and a sealing surface of the process connection.

18. The pressure sensor of claim 17, wherein:
the elastic element of the sensor clamping apparatus acts on a rear face of the pressure sensitive element between the pressure sensitive element and a counterbearing, the rear face opposite the process connection;
the elastic element includes a spring system and/or one or more mutually contacting springs;
a decoupling ring is disposed between the pressure sensitive element and the elastic element;
the process connection includes an end section having an end facing the pressure sensitive element, the end including the sealing surface, wherein the end section protrudes into the opening with a loose fit;
the sealing surface of the process connection configured as a seal seat, which has a surface contour corresponding to a surface contour of a surface of the process seal facing the process connection; and/or
the process connection includes a flange with a shoulder facing the sensor housing that rests against an abutment surface of the sensor housing, which provides an abutment for the releasable mechanical connection and faces the process connection.

19. The pressure sensor of claim 17, wherein:
the pressure sensitive element is set into a cavity in the sensor housing with interpositioning of a ring of angular cross-section having an essentially L-shaped cross-sectionally profile;
the ring of angular cross-section includes an essentially cylindrical region disposed in an annular gap between the pressure sensitive element and an inner wall of the cavity outwardly surrounding the pressure sensitive element and a radially inwardly extending shoulder gripping around an outer edge region of the front face of the pressure sensitive element;
the ring of angular cross-section seats against a ledge of the sensor housing externally bounding the opening of the sensor housing on all sides; and
the ring of angular cross-section is composed either completely of an elastomer or comprises a first component of a form-retaining material, wherein the first component comprises a pressure sensitive element far, lower part of the radially inwardly extending shoulder, extends in the axial direction into the annular gap and is connected with a second component of an elastic material, which extends into the annular gap at least sectionally between an outer lateral surface of the pressure sensitive element and the inner wall of the cavity.

20. The pressure sensor of claim 19, wherein the ring of angular cross-section forms an external containment for the process seal.

* * * * *